US011550092B1

(12) United States Patent
Varghese et al.

(10) Patent No.: US 11,550,092 B1
(45) Date of Patent: Jan. 10, 2023

(54) SYSTEM AND METHOD FOR EXTRACTING LIGHT USING FIBERS

(71) Applicant: The Boeing Company, Chicago, IL (US)

(72) Inventors: Sijo Varghese, Kerala (IN); Jeffrey H. Hunt, Thousand Oaks, CA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 17/649,198

(22) Filed: Jan. 28, 2022

(51) Int. Cl.
*F21V 8/00* (2006.01)
*G02B 6/04* (2006.01)

(52) U.S. Cl.
CPC ......... *G02B 6/0006* (2013.01); *G02B 6/0008* (2013.01); *G02B 6/04* (2013.01)

(58) Field of Classification Search
CPC ....... G02B 6/0006; G02B 6/0008; G02B 6/04
See application file for complete search history.

(56) References Cited

U.S. PATENT DOCUMENTS

| | | | | |
|---|---|---|---|---|
| 2011/0157557 A1* | 6/2011 | Vogel | ...................... | G09F 19/22 353/30 |
| 2015/0062956 A1* | 3/2015 | Genier | ................. | G02B 6/0008 362/554 |
| 2022/0309980 A1* | 9/2022 | Wang | ..................... | H04M 1/22 |

FOREIGN PATENT DOCUMENTS

| | | | |
|---|---|---|---|
| KR | 20130077057 A | * 9/2013 | |
| KR | 20150110933 A | * 10/2015 | |
| WO | WO-2008062929 A1 | * 5/2008 | ........... G02B 6/0006 |

OTHER PUBLICATIONS

Messer, A'ndrea Elyse, "Saving LED Light Bulbs", Futurity, Feb. 20, 2019, Penn State, 20 pages. URL: https://www.osapublishing.org/josab/fulltext.cfm?uri=josab-36-10-2810&id=418804, retrieved on Jan. 25, 2022.
Bay et al., "Improved light extraction in the bioluminescent lantern of a Photuris firefly (*Ampyridae*)," Optics Express 21(1):7:764-80. URL: https://www.chemistryworld.com/news/fireflies-inspire-low-cost-led-lighting-/5573.article, retrieved on Jan. 25, 2022.
Kim et al., "Biologically inspired LED lens from cuticular nanostructures of firefly lantern," Proceedings of the National Academy of Sciences of the United States of America (PNAS), Nov. 13, 2012, pp. 18674-18678, vol. 109, No. 46. URL: https://cen.acs.org/articles/94/web/2016/04/Firefly-inspires-brighter-LEDs.html. retrieved on Jan. 25, 2022.
Patel, "Firefly-inspired LEDs Shine Bright On Less Energy," Daily Science, Mar. 7, 2019, Anthropocene Magazine, 8 pages. URL: https://www.osa-opn.org/home/newsroom/2019/february/fireflies_inspire_more_efficient_leds/, retrieved on Jan. 25, 2022.

(Continued)

*Primary Examiner* — Erin Kryukova
(74) *Attorney, Agent, or Firm* — MH2 Technology Law Group LLP

(57) ABSTRACT

An apparatus for concentrating light from a light source includes a plurality of fibers that are substantially parallel with one another. Each fiber includes a light-receiving end and a light-transmitting end. The light-receiving end is configured to receive the light from the light source. The light-transmitting end is configured to transmit the light from the fiber. The light-receiving ends the fibers extend different distances from a plane that is perpendicular with respect the fibers.

20 Claims, 3 Drawing Sheets

(56) References Cited

OTHER PUBLICATIONS

Green et al., "How fireflies inspired energy-efficient lights," BBC News, Science & Environment, May 7, 2019, 1 page. URL: https://www.bbc.com/news/av/science-environment-48152165, retrieved on Jan. 25, 2022.
Michaud, "Fireflies Inspire More Efficient LEDs," Optics & Photonics News, Feb. 27, 2019, 3 pages. URL: https://www.anthropocenemagazine.org/2019/03/firefly-inspired-leds-shine-bright-on-less-energy/, retrieved on Jan. 25, 2022.
Bourzac, "Firefly inspires brighter LEDs," Biological Chemistry, Apr. 19, 2016, 3 pages. URL: https://www.pnas.org/content/109/46/18674, retrieved on Jan. 25, 2022.
Urquhart, "Fireflies inspire low-cost LED lighting" Chemistry World, Oct. 28, 2012, 4 pages. URL: Https://www.researchgate.net/publication/235415464_Improved_light_extraction_in_the_bioluminescent_lantern_of_a_Photuris_firefly_Lampyridae, retrieved on Jan. 25, 2022.
Liu et al., "Wide-angle Moiré metalens with continuous zooming," Journal of the Optical Society of America B, 2019, vol. 36, Issue 10, pp. 2810-2816. URL: https://www.futurity.org/light-bulbs-leds-fireflies-1988062/, retrieved on Jan. 25, 2022.

\* cited by examiner

SYSTEM AND METHOD FOR EXTRACTING LIGHT USING FIBERS

FIELD

The subject matter described herein generally relates to increasing light extraction efficiency. More particularly, the subject matter disclosed herein relates to increasing light extraction efficiency from a light emitting diode (LED) using nanofibers or microfibers.

BACKGROUND

Conventional LEDs are about 50% efficient. The other 50% is lost as trapped light due to total internal reflection (TIR). Total internal reflection is the optical phenomenon in which waves arriving at the interface (boundary) from one medium to another (e.g., from water to air) are not refracted into the second ("external") medium, but completely reflected back into the first ("internal") medium. It occurs when the second medium has a higher wave speed (lower refractive index) than the first, and the waves are incident at a sufficiently oblique angle on the interface.

One existing solution to increase the light extraction from the LED, and thus increase the efficiency of the LED, is to form micro-structures in the shape of asymmetric cones, somewhat akin to the scales found on the abdomen of a firefly. However, the light that can escape through the micro-structures can still be diverted in an undesired direction after exiting the LED because the refraction may cause the light to project at an obtuse angle relative to the desired orthogonal direction.

SUMMARY

An apparatus for concentrating light from a light source is disclosed. The apparatus includes a plurality of fibers that are substantially parallel with one another. Each fiber includes a light-receiving end and a light-transmitting end. The light-receiving end is configured to receive the light from the light source. The light-transmitting end is configured to transmit the light from the fiber. The light-receiving ends the fibers extend different distances from a plane that is perpendicular with respect the fibers.

In another implementation, the apparatus includes a plurality of fibers that are substantially parallel with one another. The light source is an overhead passenger light source in an aircraft. Each fiber has a cross-sectional width from about 1 nm to about 10 µm. Each fiber includes a light-receiving end that is configured to receive the light from the light source. Each fiber includes a light-transmitting end that is configured to transmit the light from the fiber. The light-receiving end of each fiber is located closer to the light source than the light-transmitting end. Two or more subsets of the fibers are arranged side-by-side. Each subset includes two or more of the fibers that have different lengths. The light-receiving ends of the two or more fibers in each subset extend different distances from a plane that is perpendicular with respect to central longitudinal axes through the fibers. The light-transmitting ends of the two or more fibers in each subset extend the same distance from the plane. A radiant energy of the apparatus is from about 2.2 to about 3.0. An emissivity of the apparatus is from about 75% to about 99%.

A method for concentrating light from a light source is also disclosed. The method includes positioning a light-concentrating apparatus between the light source and a target. The light-concentrating apparatus includes a plurality of fibers that are substantially parallel with one another. Each fiber includes a light-receiving end and a light-transmitting end. The light-receiving end is configured to receive the light from the light source. The light-transmitting end is configured to transmit the light from the fiber toward the target. The light-receiving ends the fibers extend different distances from a plane that is perpendicular with respect to the fibers. The method also includes causing the light to be transmitted from the light source to the light-receiving ends of the fibers.

DRAWINGS

The above and/or other aspects and advantages will become more apparent and more readily appreciated from the following detailed description of examples, taken in conjunction with the accompanying drawings, in which.

DETAILED DESCRIPTION

Figure 1:
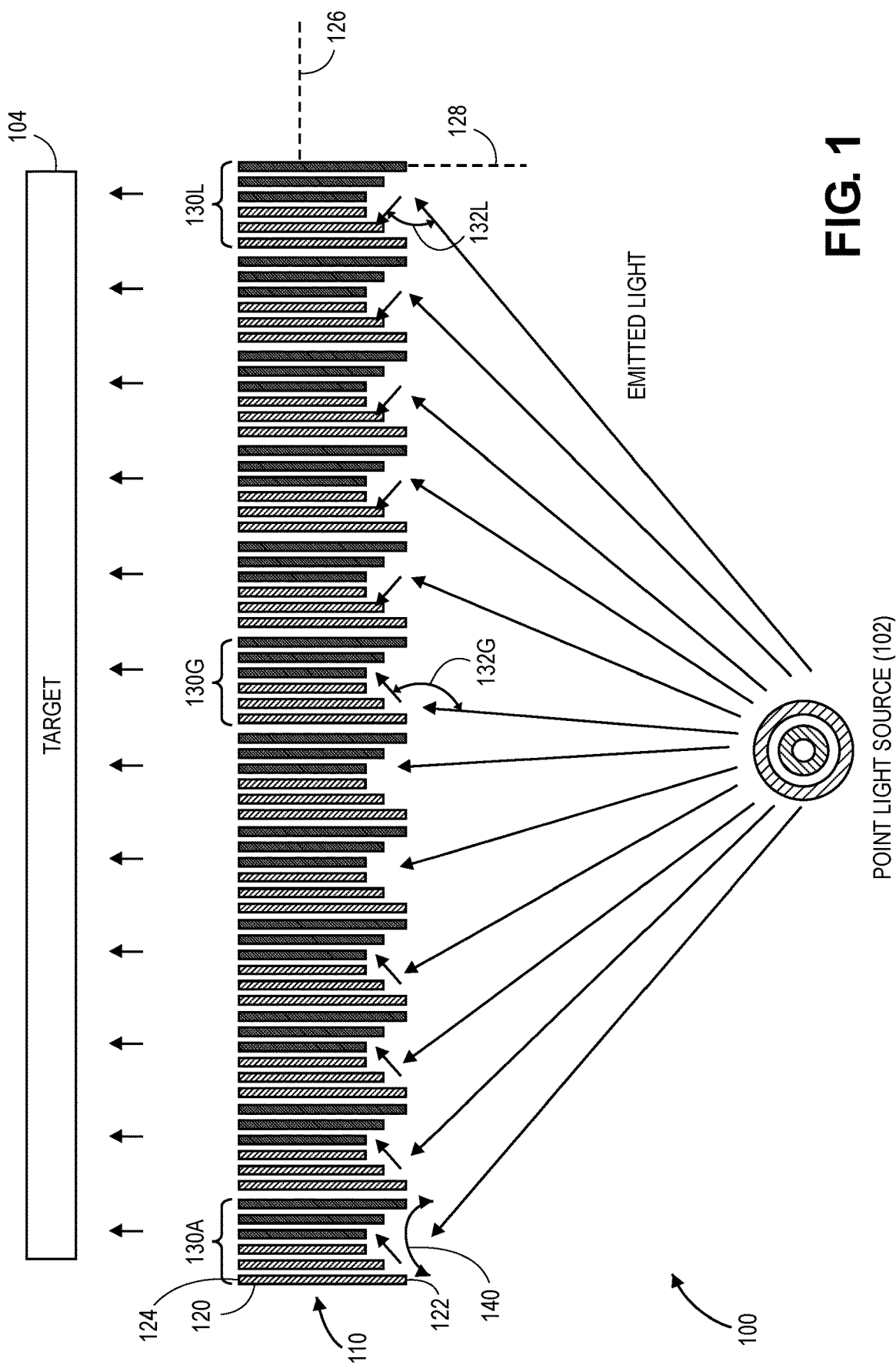
FIG. 1 illustrates a side view of a system for concentrating light, according to one or more implementations.

Exemplary aspects will now be described more fully with reference to the accompanying drawings. Examples of the disclosure, however, can be embodied in many different forms and should not be construed as being limited to the examples set forth herein. Rather, these examples are provided so that this disclosure will be thorough and complete, and will fully convey the scope to those skilled in the art. In the drawings, some details may be simplified and/or may be drawn to facilitate understanding rather than to maintain strict structural accuracy, detail, and/or scale.

It will be understood that when an element is referred to as being "on," "associated with," "connected to," "electrically connected to," or "coupled to" to another component, it may be directly on, associated with, connected to, electrically connected to, or coupled to the other component or intervening components may be present. In contrast, when a component is referred to as being "directly on," "directly associated with," "directly connected to," "directly electrically connected to," or "directly coupled to" another component, there are no intervening components present. As used herein, the term "and/or" includes any and all combinations of one or more of the associated listed items.

It will be understood that although the terms first, second, etc., may be used herein to describe various elements, components, and/or directions, these elements, components, and/or directions should not be limited by these terms. These terms are only used to distinguish one element, component, and/or direction from another element, component, and/or direction. For example, a first element, component, or direction could be termed a second element, component, or direction without departing from the teachings of examples.

Spatially relative terms, such as "beneath," "below," "lower," "above," "upper," and the like may be used herein for ease of description to describe the relationship of one component and/or feature to another component and/or feature, or other component(s) and/or feature(s), as illustrated in the drawings. It will be understood that the spatially relative terms are intended to encompass different orientations of the device in use or operation in addition to the orientation(s) depicted in the figures.

FIG. 1 illustrates a side view of a system 100 for concentrating light, according to one or more implementations. The system 100 may include a light source 102, a target 104, a light-concentrating apparatus 110, or a combination thereof. The system 100 may be part of a vehicle (e.g., FIG. 3). For example, the system 100 may be part of an overhead aircraft lighting system (e.g., 100 in FIG. 3). The light source 102 may be a point light source such as one or more light-emitting diodes (LEDs).

The apparatus 110 is configured to be positioned at least partially between the light source 102 and the target 104. As described in greater detail below, the apparatus 110 is configured to concentrate the light from the light source 102 to the target 104, thereby increasing the light extraction efficiency. For example, the light extraction efficiency may be greater than 70%, greater than 80%, greater than 90%, or greater than 95%. The apparatus 110 may also or instead achieve a narrower or wider light dispersion effect, which may be controllable based upon the lighting requirement.

The apparatus 110 may include a plurality or cluster of fibers 120. The fibers 120 may be substantially parallel with one another. The propagation of the light may be controllable by pointing the fibers in the desired direction (e.g., toward the target 104). The fibers 120 may be substantially cylindrical. The fibers, in examples, are microfibers or nanofibers. For example, each fiber 120 have a cross-sectional width (e.g., diameter) from about 1 nm to 1 mm, from about 1 nm to about 100 μm, from about 1 nm to about 10 μm, from about 1 nm to about 1 μm, from about 1 nm to about 100 nm, or from about 1 nm to about 10 nm. The fibers 120 may have the same cross-sectional widths or different cross-sectional widths. Each fiber 120 may have a length from about 5 nm to about 5 cm, about 5 nm to about 500 μm, about 5 nm to about 50 μm, about 5 nm to about 5 μm, or about 5 nm to about 500 nm. The length may be from about 2× to about 10× (e.g., 5×) greater than the width.

Each fiber 120 includes a first (e.g., light-receiving) end 122 that is configured to receive the light from the light source 102. Each fiber 120 also includes a second (e.g., light-transmitting) end 124 that is configured to transmit the light to the target 104. The light-receiving ends 122 are located closer to the light source 102 than the light-transmitting ends 124.

A plurality of subsets 130A-130L of the fibers 120 may be arranged side-by-side one another. Each subset 130A-130L may include two or more of the fibers 120 that have different lengths (i.e., the distance between the ends 122, 124). The light-receiving ends 122 of the fibers 120 in each subset 130A-130L may extend different distances from a plane 126 that is perpendicular with respect to central longitudinal axes 128 through the fibers 120. In other words, the light-receiving ends 122 may be asymmetric with respect to the plane 126. For example, the light-receiving ends 122 may be arranged in a mis-aligned (e.g., step-like) manner. As discussed below, this may prevent the light from contacting the fibers 120 at a critical angle, which may reduce the likelihood of total internal reflection. In addition, having the fibers 120 vary in length may cause the light entering the fibers 120 to experience an outward propagation.

The light-transmitting ends 124 of the fibers 120 in each subset 130A-130L may extend the same distance from the plane 126. In other words, the light-transmitting ends 124 may be symmetric with respect to the plane 126. For example, the light-transmitting ends 124 may be substantially aligned with one another.

The light-receiving ends 122 of the fibers 120 in each subset 130A-130L form a substantially concave profile 140. In other words, a plurality of concave profiles 140 (e.g., twelve) may be present. The substantially concave profile 140 of a first of the subsets (e.g., subset 130G) is configured to cause at least a portion of the light from the light source 102 to reflect off of one of the fibers 120 in the first subset 130G at an obtuse angle 132G and to enter another of the fibers 120 in the first subset 130G at an angle of incidence that is less than a critical angle. The substantially concave profile 140 of a second of the subsets 130L is configured to cause at least a portion of the light from the light source 102 to reflect off of one of the fibers 120 in the second subset 130L at an acute angle 132L and to enter another of the fibers 120 in the second subset 130L at an angle of incidence that is less than a critical angle. The first subset 130G may be located closer to the light source 102 than the second subset 130L. This arrangement may concentrate the light from the light source 102 to the target 104 thereby increasing (e.g., maximizing) the light extraction efficiency. The angle of incidence is the angle between a light ray incident on a surface (e.g., the light-receiving end 122) and the line perpendicular to the surface at the point of incidence, called the normal. The critical angle is the smallest angle of incidence that yields total reflection, or equivalently the largest angle for which a refracted light ray exists.

Figure 2:
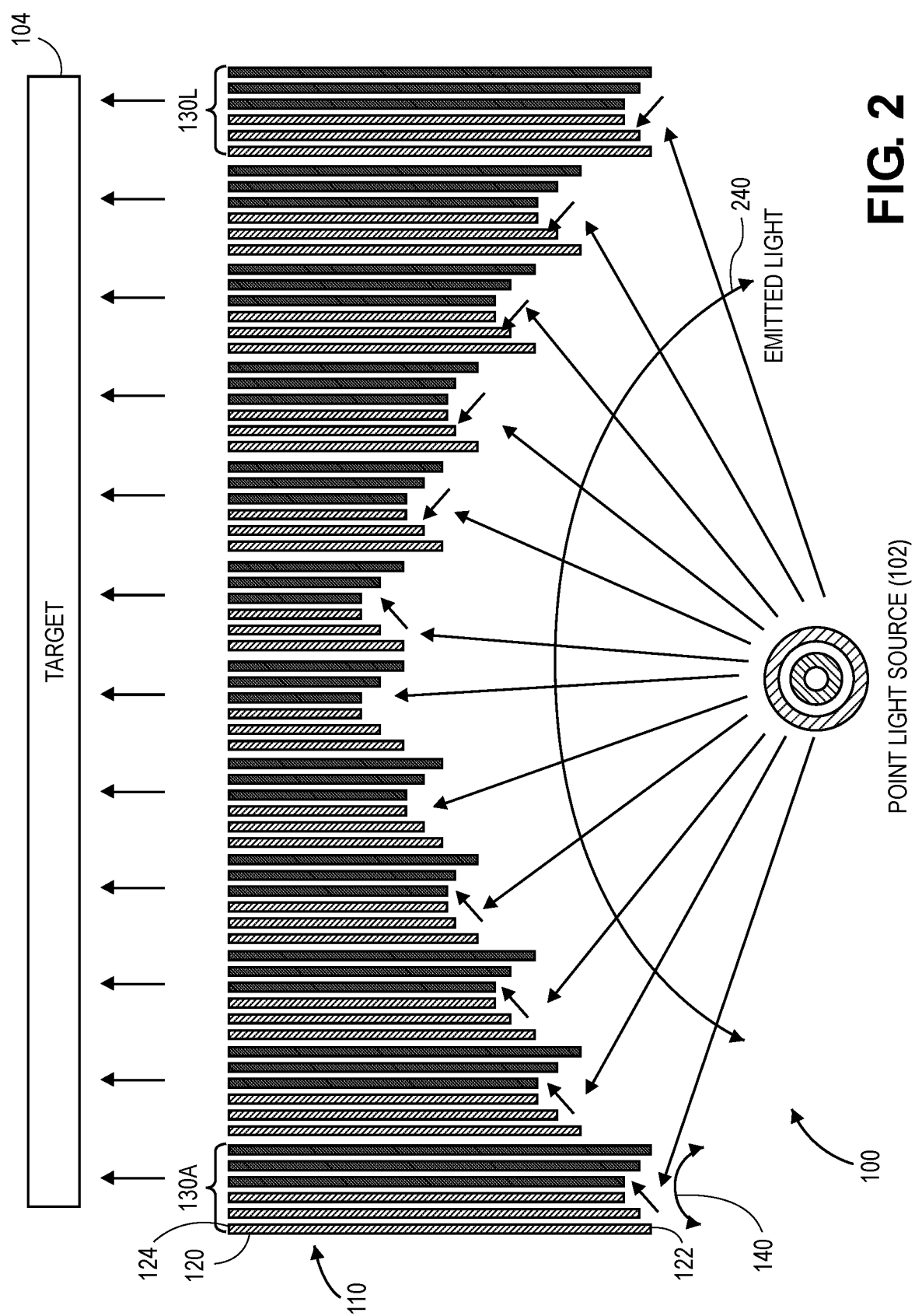
FIG. 2 illustrates a side view of the system with a light-receiving end of a light-concentrating apparatus in a substantially concave shape, according to one or more implementations.

FIG. 2 illustrates a side view of the system 100 with the light-receiving end of the apparatus 110 in a substantially concave shape 240, according to one or more implementations. As mentioned above with respect to FIG. 1, the light-receiving ends 122 of the fibers 120 in each subset 130A-130L may form a substantially concave profile 140, resulting in a plurality of smaller substantially concave profiles. In FIG. 2, the light-receiving ends 122 of the fibers 120 of the two or more subsets (e.g., all of the subsets 130A-130L) may form a larger substantially concave profile 240. Thus, a plurality of smaller substantially concave profiles 140 may be present within the larger substantially concave profile 240. This may further concentrate the light from the light source 102 to the target 104 thereby increasing (e.g., maximizing) the light extraction efficiency. In another implementation, the larger substantially concave profile 240 may be present, and the smaller substantially concave profiles 140 may be omitted such that the larger substantially concave profile 240 is smoother than that shown in FIG. 2. The profiles may also or instead be substantially rectangular, circular, or ovular.

In one implementation, the sustainability and/or life improvement of the apparatus 110 may be better than that of conventional apparatuses by delaying obsolescence. First, the apparatus 110 may consume less energy to generate nominal lumen which otherwise conventionally may require higher electrical energy. This contributes to sustainability. Second, the apparatus 110 may reduce the overall heating of the light source 102 by increasing the light extraction therefrom. This contributes to life improvement.

The improvements to sustainability and/or life improvement may be achieved by:

$$E = \varepsilon' \sigma T^4 \quad \text{(Equation 1)}$$

where E is the radiant heat energy emitted from a unit area in one second. The apparatus 110 may increase this value (e.g., cause this value to be greater than in conventional apparatuses). In one implementation, the radiant heat energy E for the system 100 (e.g., apparatus 110) may be from about 2.2 to about 3.0, about 2.4 to about 3.0, about 2.6 to about 3.0, or about 2.8 to about 3.0, whereas the radiant heat energy E for conventional apparatuses is about 2.062. This means that the apparatus 110 may radiate more heat energy outward, which decreases the overall temperature of the light source 102. The variable ε' is emissivity. This value may be from about 75% to about 99%, about 80% to about 95%, or about 90% to about 95% compared to about 70% for conventional apparatuses. The variable σ is the Boltzman constant (i.e., $5.670374419 \times 10^{-8}$ W/m$^2$ per K$^4$. The variable T is the absolute temperature, which may be the temperature at the light source 102 (e.g., LED bulb) heat sink. The temperature T may be from about 333.15 K to about 373.15 K.

Figure 3:
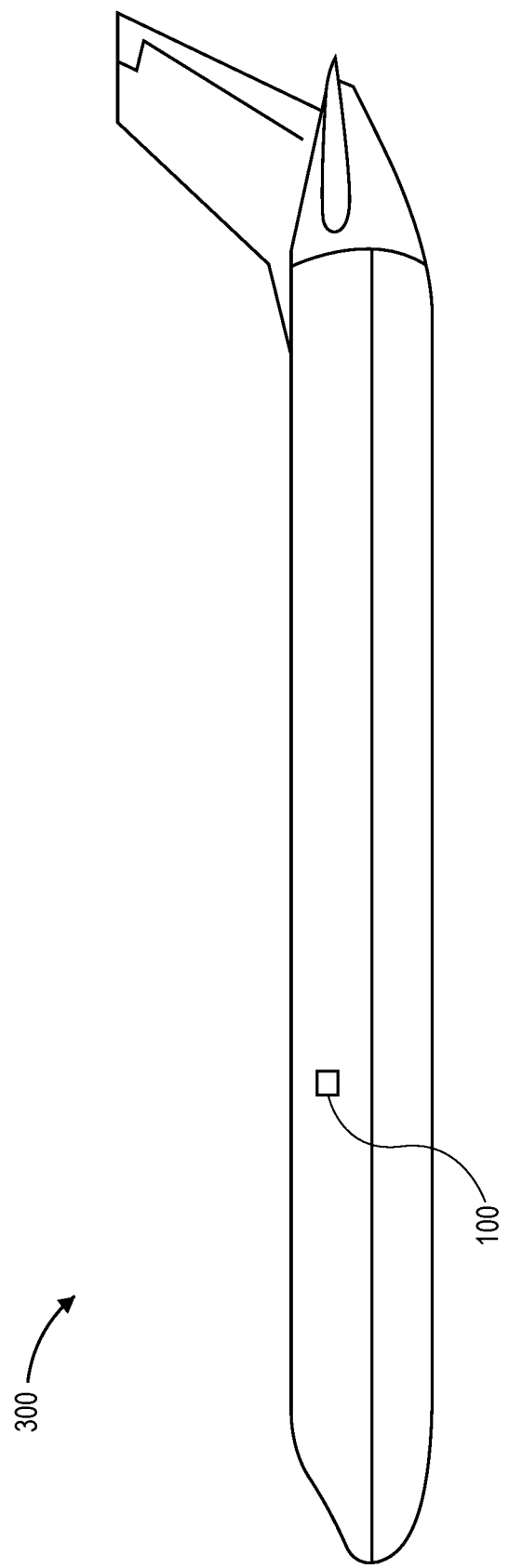
FIG. 3 illustrates a side view of a vehicle, according to one or more implementations.

FIG. 3 illustrates a side view of a vehicle 300, according to one or more implementations. As shown, the vehicle 300 may be an aircraft (e.g., an airplane). In other implementations, the vehicle 300 may be or include car, a bus, a train, boat, a helicopter, an unmanned aerial vehicle (e.g., a drone), a satellite, a spacecraft, or the like. The system 100 may be on or in the vehicle 300. For example, the system 100 may be part of an overhead aircraft lighting system in the cabin of the vehicle 300.

While the foregoing disclosure has been described in some detail by way of illustration and example for purposes of clarity and understanding, it will be clear to one of ordinary skill in the art from a reading of this disclosure that various changes in form and detail can be made without departing from the true scope of the disclosure and may be practiced within the scope of the appended claims. For example, all the methods, systems, and/or component parts or other aspects thereof can be used in various combinations. All patents, patent applications, websites, other publications or documents, and the like cited herein are incorporated by reference in their entirety for all purposes to the same extent as if each individual item were specifically and individually indicated to be so incorporated by reference.

What is claimed is:

1. An apparatus for concentrating light from a light source, the apparatus comprising:
    a plurality of fibers that are substantially parallel with one another, wherein each fiber comprises a light-receiving end and a light-transmitting end, wherein the light-receiving end is configured to receive the light from the light source, wherein the light-transmitting end is configured to transmit the light from the fiber, wherein two or more subsets of the fibers are arranged side-by-side with one another along a plane that is perpendicular with respect the fibers, and wherein the light-receiving ends of the fibers in each subset extend different distances from the plane to form a substantially concave profile.

2. The apparatus of claim 1, wherein each fiber has a cross-sectional width from about 1 nm to about 1 mm.

3. The apparatus of claim 1, wherein the light-receiving end of each fiber is located closer to the light source than the light-transmitting end.

4. The apparatus of claim 1, wherein two or more of the fibers have different lengths.

5. The apparatus of claim 1, wherein the light-transmitting ends of the fibers extend the same distance from the plane.

6. The apparatus of claim 1, wherein the substantially concave profile of a first of the subsets is configured to cause at least a portion of the light from the light source to reflect off of one of the fibers in the first subset at an obtuse angle and to enter another of the fibers in the first subset at an angle of incidence that is less than a critical angle.

7. The apparatus of claim 6, wherein the substantially concave profile of a second of the subsets is configured to cause at least a portion of the light from the light source to reflect off of one of the fibers in the second subset at an acute angle and to enter another of the fibers in the second subset at an angle of incidence that is less than a critical angle.

8. The apparatus of claim 7, wherein the first subset is closer to the light source than the second subset.

9. The apparatus of claim 7, wherein the light-receiving ends of the fibers of the two or more subsets form a larger substantially concave profile, and wherein the light-receiving ends of the first and second subsets form two smaller substantially concave profiles within the larger substantially concave profile.

10. The apparatus of claim 1, wherein the light-receiving ends of the fibers in each subset extend different distances from the plane to form the substantially concave profile such that the two or more subsets of the fibers form a plurality of smaller substantially concave profiles that are arranged side-by-side with one another along the plane, wherein the light-receiving ends of the fibers in the two or more subsets of the fibers also form a larger substantially concave profile, and wherein the larger substantially concave profile comprises the plurality of smaller substantially concave profiles.

11. The apparatus of claim 1, wherein the light-receiving end comprises a substantially planar end face, wherein the end face is substantially parallel to the plane, and wherein a central longitudinal axis through the end face is perpendicular to the plane.

12. An apparatus for concentrating light from a light source, the apparatus comprising:
    a plurality of fibers that are substantially parallel with one another, wherein:
        the light source comprises an overhead passenger light source in an aircraft;
        each fiber has a cross-sectional width of from about 1 nm to about 10 μm;
        each fiber comprises a light-receiving end that is configured to receive the light from the light source;
        each fiber comprises a light-transmitting end that is configured to transmit the light from the fiber;
        the light-receiving end of each fiber is located closer to the light source than the light-transmitting end;
        two or more subsets of the fibers are arranged side-by-side with one another along a plane that is perpendicular with respect to central longitudinal axes through the fibers;
        each subset comprises two or more of the fibers that have different lengths;
        the light-receiving ends of the two or more fibers in each subset extend different distances from the plane to form a substantially concave profile;
        the light-transmitting ends of the two or more fibers in each subset extend the same distance from the plane;
        a radiant energy of the apparatus is from about 2.2 to about 3.0; and
        an emissivity of the apparatus is from about 75% to about 99%.

13. The apparatus of claim 12, wherein the substantially concave profile of a first of the subsets is configured to cause at least a portion of the light from the light source to reflect off of one of the fibers in the first subset at an obtuse angle and to enter another of the fibers in the first subset at an angle of incidence that is less than a critical angle.

14. The apparatus of claim 13, wherein the substantially concave profile of a second of the subsets is configured to cause at least a portion of the light from the light source to reflect off of one of the fibers in the second subset at an acute angle and to enter another of the fibers in the second subset at an angle of incidence that is less than a critical angle.

15. The apparatus of claim 14, wherein the light-receiving ends of the fibers of the two or more subsets form a larger substantially concave profile, and wherein the light-receiving ends of the first and second subsets form two smaller substantially concave profiles within the larger substantially concave profile.

16. A method for concentrating light from a light source, the method comprising:

positioning a light-concentrating apparatus between the light source and a target, wherein the light-concentrating apparatus comprises a plurality of fibers that are substantially parallel with one another, wherein each fiber comprises a light-receiving end and a light-transmitting end, wherein the light-receiving end is configured to receive the light from the light source, wherein the light-transmitting end is configured to transmit the light from the fiber toward the target, wherein two or more subsets of the fibers are arranged side-by-side with one another along a plane that is perpendicular with respect the fibers, and wherein the light-receiving ends of the fibers in each subset extend different distances from the plane to form a substantially concave profile; and causing the light to be transmitted from the light source to the light-receiving ends of the fibers.

17. The method of claim 16, further comprising varying a distance that one or more of the light-receiving ends extend from the plane.

18. The method of claim 16, further comprising varying a profile of the light-receiving ends to increase a percentage of the light from the light source that travels through the fibers.

19. The method of claim 18, wherein varying the profile comprises causing the light-receiving ends of a first subset of the fibers to have a substantially concave profile.

20. The method of claim 19, wherein the light-concentrating apparatus comprises a plurality of subsets of fibers that are side-by-side with one another, wherein the plurality of subsets includes the first subset, and wherein varying the profile also comprises causing the light-receiving ends of the plurality of subsets to form a larger substantially concave profile, and wherein the first subset forms a smaller substantially concave profile within the larger substantially concave profile.

* * * * *